US008572256B2

(12) United States Patent
Babbar

(10) Patent No.: US 8,572,256 B2
(45) Date of Patent: Oct. 29, 2013

(54) METHOD FOR SUPPORTING MULTIPLE DIVERSIFIED DATA APPLICATIONS WITH EFFICIENT USE OF NETWORK RESOURCES

(75) Inventor: Uppinder Singh Babbar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1472 days.

(21) Appl. No.: 12/173,733

(22) Filed: Jul. 15, 2008

(65) Prior Publication Data

US 2009/0069018 A1    Mar. 12, 2009

Related U.S. Application Data

(60) Provisional application No. 60/950,110, filed on Jul. 16, 2007.

(51) Int. Cl.
*G06F 15/16* (2006.01)
(52) U.S. Cl.
USPC .......................................... 709/227
(58) Field of Classification Search
USPC ....................... 709/227; 455/556.2
See application file for complete search history.

(56) References Cited

U.S. PATENT DOCUMENTS

| 6,134,608 | A  * | 10/2000 | Jacober et al. .................. 710/40 |
| 7,062,274 | B2   | 6/2006  | Shell et al. |
| 7,428,217 | B2 * | 9/2008  | Kobayashi et al. ........... 370/235 |
| 7,526,572 | B2 * | 4/2009  | Omar et al. .................... 709/246 |
| 7,797,679 | B2 * | 9/2010  | Tysowski et al. ............. 717/121 |
| 8,150,933 | B2 * | 4/2012  | Martin et al. ................. 709/207 |
| 8,165,101 | B2 * | 4/2012  | Abhishek et al. ............. 370/338 |
| 2001/0003191 | A1 * | 6/2001 | Kovacs et al. ................ 709/226 |
| 2005/0143082 | A1 * | 6/2005 | Yang .......................... 455/452.1 |
| 2005/0148359 | A1 * | 7/2005 | Joeressen ................... 455/552.1 |
| 2005/0191991 | A1 * | 9/2005 | Owen et al. .................... 455/411 |
| 2006/0135143 | A1 * | 6/2006 | Suematsu ..................... 455/418 |

(Continued)

FOREIGN PATENT DOCUMENTS

| CN | 1810048 A | 7/2006 |
| JP | 10247913 A | 9/1998 |
| JP | 2000295285 A | 10/2000 |
| JP | 2007072664 A | 3/2007 |
| JP | 2008502238 A | 1/2008 |
| WO | 2005122497 A1 | 12/2005 |
| WO | 2006130807 A2 | 12/2006 |

OTHER PUBLICATIONS

International Search Report and the Written Opinion—PCT/US2008/070216, International Search Authority—European Patent Office—Oct. 2, 2009.

*Primary Examiner* — Jason Recek
*Assistant Examiner* — Benjamin Ailes
(74) *Attorney, Agent, or Firm* — James T. Hagler

(57) ABSTRACT

To enable applications to share an established data connection, communication configuration parameters identified by a new application are compared to the parameters requested by applications already sharing the data connection. If there are no conflicts with exclusive configuration parameter(s) required by a new application, a union rule is applied to each shareable configuration parameter of the new and currently executing applications using the data connection to determine a mutually acceptable configuration. Also determined is a measure of the degree to which all applications are supported by a compromise parameter determined by the union rule. The data connection best supporting the sharable parameters of the new and executing applications is assigned to the new application. When an application terminates, the union rules may be applied to parameters requested by the remaining applications to reconfigure the data connection. A similar process may be used when an application requests changes to configuration parameters.

28 Claims, 8 Drawing Sheets

(56) References Cited

U.S. PATENT DOCUMENTS

| | | | |
|---|---|---|---|
| 2007/0064641 A1* | 3/2007 | Laroia et al. | 370/320 |
| 2007/0099659 A1* | 5/2007 | Borquez et al. | 455/556.2 |
| 2007/0118662 A1* | 5/2007 | Vishwanathan et al. | 709/227 |
| 2008/0014916 A1* | 1/2008 | Chen | 455/422.1 |
| 2008/0047023 A1* | 2/2008 | Lam et al. | 726/30 |
| 2008/0051059 A1* | 2/2008 | Fisher | 455/410 |
| 2008/0178273 A1* | 7/2008 | Weber | 726/7 |
| 2010/0287533 A1* | 11/2010 | Tysowski et al. | 717/121 |
| 2011/0055563 A1* | 3/2011 | Chandran et al. | 713/168 |
| 2011/0093340 A1* | 4/2011 | Kramer et al. | 705/14.58 |

\* cited by examiner

METHOD FOR SUPPORTING MULTIPLE DIVERSIFIED DATA APPLICATIONS WITH EFFICIENT USE OF NETWORK RESOURCES

RELATED APPLICATIONS

The present application claims the benefit of priority to U.S. Provisional Patent Application No. 60/950,110 filed Jul. 16, 2007 entitled "Supporting Multiple Diversified Data Applications With Efficient Use of Network Resources," the entire contents of which are hereby incorporated by reference.

FIELD OF THE INVENTION

The present invention relates generally to wireless data networks, and more specifically to supporting multiple diversified data applications with efficient use of network resources.

BACKGROUND

With ever widening use and popularity of communication networks such as the Internet, an ever increasing number of users enjoy communication network services like the World Wide Web and e-mail services. Recently, cellular phones with data inputting functions have been extensively used for transmission and reception of data and messages over such networks in addition to information processing terminals as personal information managers and hand held computers.

Cellular phones are also becoming more powerful, and therefore capable of executing a wide variety of programs. Many users are using their cellular phones as a portable computer and running multiple applications such as games, productivity software, music and video players, instant messaging programs, GPS programs and many other programs. The diversity of programs now capable of executing on a cellular phone is almost limitless.

Each application running on the cellular phone may require a different communication configuration. Each configuration may depend upon the exported behavior of the application and type of service it provides. For example, a Global Positioning System (GPS) application may only require a single carrier Radio Transmission Technology (1× RTT) system to work and may not be able to run on an Evolution-Data Only (EVDO) network service. Similarly, a voice-over-IP (VoIP) application may need a high data rate network (e.g., DoRev A, WLAN or HSPDA) that can also provide required quality-of-service (QOS) capabilities. Push-to-talk (PTT) applications may configure radio layers (RLP/RLC) to obtain least delay path with limited reliability. Practically speaking, it is neither feasible nor cost effective to setup a separate and dedicated data connection/radio path for each type of application.

SUMMARY

The various embodiments provide a method and systems for supporting diversified applications efficiently utilizing a limited number of radio/network resources. The embodiments allow multiple diversified applications to obtain access to desired data connection services by sharing communication connections. The various embodiment methods may be implemented in a connection manager software module within a computing device operating within a computing device. The connection manager may gather specified exclusive and shareable data connection configuration parameters for the new application as well as each of a plurality of applications sharing a data connection. For each data connection the connection manager can determine whether any of the exclusive parameters specified by the new application conflict with exclusive parameters required by applications already using each data connection. If a data connection has a conflict between an existing exclusive parameter and an exclusive parameter specified by the new application, that data connection may be removed from further consideration. If no exclusive parameter conflicts exist on a data connection the connection manager may compute a resultant value based on a union rule for each of the shareable configuration parameters. The connection manager may also assign a priority or quality measure to each data connection based on the degree to which the computed resultant value satisfies the applications using the data connection. Based on the assigned priority or quality measure the connection manager may select an optimum data connection to assign to the new application, and configure the data connection using the computed resultant parameter values. Data connection configuration may also be updated when applications terminate and when applications request a modification to data connection configuration parameters using similar methods.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
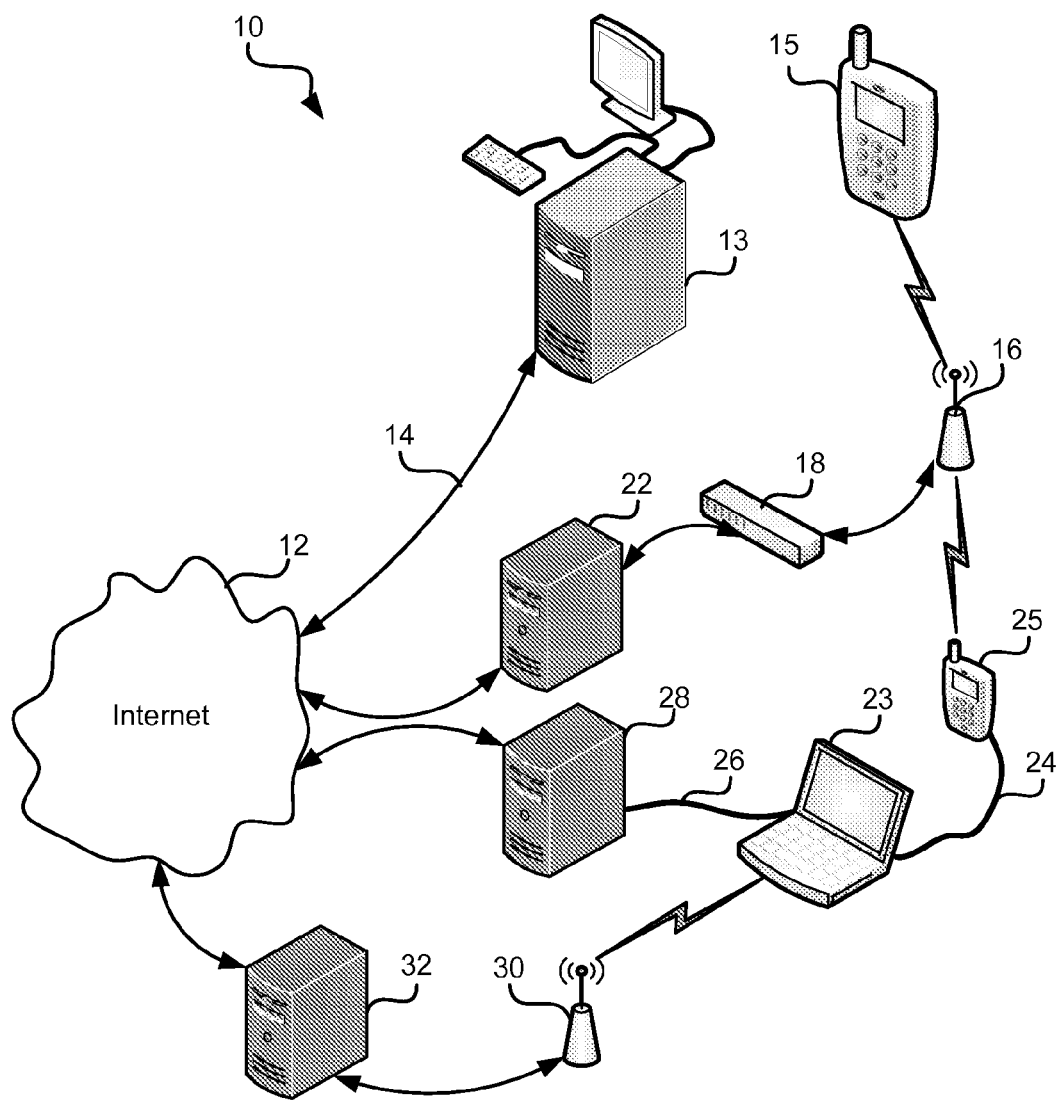
FIG. 1 is a system block diagram of wireless cellular network.

In this description, the terms "exemplary" is used herein to mean "serving as an example, instance, or illustration." Any implementation described herein as "exemplary" is not necessarily to be construed as preferred or advantageous over other implementations.

As used herein, the terms "computing device," "mobile device" and "portable computing device" refer to any one or all of cellular telephones, personal data assistants (PDA's), palm-top computers, wireless electronic mail receivers and cellular telephone receivers (e.g., the BLACKBERRY® and TREO® devices), multimedia Internet enabled cellular telephones (e.g., the IPHONE®), wireless network transceiver cards for use in a personal computer, and similar personal electronic devices which include a programmable processor and memory and the capability to connect to a wireless network. The terms may also encompass personal computers, such as a laptop computer or a desktop computer, with wired and wireless network transceiver circuits or when used in the description of the various embodiments which may also be implemented on or with personal computers. While the description of the various embodiments refer to cellular telephone network systems including cell towers of such networks, the scope of the present invention and the claims encompass any communication system including wireless networks such as, for example, WiFi, WiMax, cellular telephone data networks, near-field communication data links, and other wireless data network communication technologies, as well as wired networks such as local area networks (LAN), wide area networks (WAN) and the Internet.

As used herein, the terms "data network connection," "data connection" and "connection" are used interchangeably to refer to a port or circuit available to a computing device processor for establishing a communication link to another computing device or network. These terms apply to any type of communication connection and are not limited to a particular type of data connection as the communication link can also communicate commands and network configuration information. Also, these terms apply to any type of communication technology including wired and wireless networks.

Many computing devices can establish data connections with external wired and wireless networks with the various data network connections characterized by a number of configuration parameters. For example, a computing device may establish a data connection over a Wi-Fi network utilizing secure sockets layer (SSL) protocol to establish a secure communication link, or over an EVDO data link utilizing a specified QOS parameter. The data connection characteristic configuration parameters are requested by the particular application executing on the computing device that uses the data connection in order to indicate desired services. These parameters are passed down to the data stack and network controllers at the time of setting up the data network connection.

Often, applications are able to share data connections. For example, an email application with minimal data connection requirements may be able to share a data connection with a more robust application such as a video stream viewer. In some circumstances, multiple robust applications can share data connections if the particular requirements of each of the multiple robust applications do not conflict. Sharing data connections among multiple applications allows more applications to run simultaneously on a computing device with a limited number of data connects available.

Wireless data networks can support diversified applications, including for example, multimedia streaming (audio, video, etc.), GPS, SMS, VoIP, PTT, etc. Typically, each application requires a different type of wireless data network connection. Wireless networks are flexible enough to be configured differently to support different types of data connectivity options. Some such data connectivity configuration parameters or options include, for example, The various wireless network technologies, including CDMA, UMTS, Long Term Evolution (LTE), WiFi, WIMAX, etc.;

The bearer mode—CDMA (1×, EvDO, Do Rev A/B, Hybrid etc), UMTS (GPRS, EDGE, HSPA), WLAN (IEEE 802.11a, b, g, etc.) WiMAx (IEEE 802.16d, 802.16e etc.);

The radio bearer configuration (e.g., RLP parameters for CDMA, RLC parameters for UMTS);

Link layer parameters, including such parameters as the maximum transmission unit (MTU), framing type, etc.;

Quality of Service (QOS), including such parameters as data rates, delay, traffic classes, reliability, etc.;

IP Traffic handling, including parameters such as protocol header compression (ROHC, IPHC VJ, none), data compression (CCP etc.), etc.;

Traffic classes, including interactive, real time, background, data, etc.;

IP protocol type, including IPv4, IPv6, and Mobile IP (v4/v6);

Services provided, such as domains, server accessibility, etc.;

Security, such as IPSec (ESP, AH etc.), with or without encryption, etc.;

Authentication protocols employed (if any), including CHAP, PAP, EAP-AKA, EAP-SIM, etc.; and Misc parameters, such as inactivity timer, dormancy, etc. For example, the inactivity timer indicates how long to wait for a resource usage before the resource is automatically freed up, a parameter which can be used to initiate dormancy on an unused data connection.

The various protocols, settings and options available for configuring a data network connection are generally referred to herein as parameters, each of which can comprise multiple values or selections. As the list above reveals, some parameters are notational, non-quantizable options, such as technology type which can have values like CDMA, UMTS, WIFI, Ethernet, etc., and authentication type which can have values such as CHAP, PAP, etc. For example, a video application may request a data connection specifying the values "IPv4" and "32 kbps" for the parameters "IP protocol version" and "QOS," respectively. Each parameter available to the applications can be either "Exclusive" or "Sharable."

The ability of two or more applications to share a data connection depends upon whether the applications specify compatible data connection parameters. As the list of example parameters provided above reveals, some parameters are "exclusive" in that the application can only function with a data connect that satisfies the specified parameter, while other parameters are "shareable" in that the application can function with a data connection that is configured with an acceptable parameter value. The terms "exclusive" and "shareable" are used herein merely to describe data connection configuration parameters for which an application can and cannot accept a compromise (i.e., accept a data connection with a configuration parameter setting or value different from what it requests)—a configuration parameter that cannot be compromised is referred to herein as "exclusive," while a configuration parameter that can be compromised is referred to herein as "shareable." The term "exclusive" should not be interpreted to mean that a data connection must be dedicated to a single application, because two applications that specify the same exclusive parameter can share a data communication satisfying that particular exclusive parameter.

"Exclusive" data connection configuration parameters are configuration details that a requesting application must have as specified and cannot be compromised or altered without causing the requesting application to full. For example, applications that require a CDMA technology data connection typically cannot operate with a data connection that is other than CDMA (e.g., WIFI, LAN or UMTS). Thus, network technology is an example of an "exclusive" data connection configuration parameter—two applications can share such a CDMA data connection only if both applications are CDMA compatible. If one application requires CDMA while another application requires WIFI, for example, this conflict over the exclusive network technology parameter means these two applications cannot share the same data connection. In order for these two applications to run concurrently, the computing device will need to establish two separate data connections. Typical examples of exclusive configuration parameters include network technology, bearer mode, radio bearer configuration, and IP protocol type (e.g., IPv4 vs. IPv6).

In contrast, "shareable" data connection configuration parameters are configuration details that a requesting application can accept a compromise or variation and still function. For example, if an application specifies a data transmission rate as a shareable parameter, the application may be able to function with a slower or higher data rate. Thus, two applications that specify different data transmission rates in their data connection requests may be able to share a single data connection, such as a data connection having a data rate equal to the greater of the two specified rates. Examples of typical shareable configuration parameters include MTU, data transmission rate, QoS, and inactivity timer.

Configuration parameter exclusivity and shareability are application-specific, because some applications may be able to compromise on some configuration parameters that other applications treat as exclusive. For example, IP protocol type (i.e., IPv4 vs. IPv6) is typically an exclusive parameter, but some IPv6 applications are able to function on data connections configured to IPv4 by IP tunneling. As another example, QoS is typically shareable as indicating a target quality of service, but some applications, such as streaming video, may not be able to function with QoS less than specified.

Heretofore, when an application requiring a data connection was initiated on a computing device a new data connection satisfying the device's requested configuration parameters was opened. If the computing device did not have sufficient communication resources (e.g., communication ports or transceiver circuits) to open a new data connection, either the application would full to initiate or another application had to be terminated or paused in order to free up the communication resources to establish the new data connection. As an alternative, the computing device could connect the application to an existing data network connection. However, if that existing data network connection was configured with incompatible parameters, the application start up will full or the data connection will suffer degraded performance that may impact the performance of all applications sharing the open data connection. Since portable computing devices typically have limited communication resources and failure of an application due to connection incompatibility can frustrate users, methods are needed for efficiently allocating applications among limited communication resources.

The various embodiments provide methods for enabling multiple applications to share data connections while avoiding conflicts that could cause applications to full. A connection manager may be provided in software, such as a software function module operating in cooperation with or as part of the system software. The connection manager can gather the configuration parameters identified by a new application requesting a data connection. The connection manager may then evaluate each possible data connection under consideration as a candidate to support the new application. For each open data connection under consideration the connection manager can evaluate each exclusive parameter specified by the requesting application to determine whether there is a conflict with any other application using the data connection If there is a conflict between an exclusive parameter of the new application with the corresponding exclusive parameter of another application using the data connection, that data connection candidate is removed from further consideration (i.e., taken out of the list of data connections being evaluated as candidates to support the new application) and the next data connection is evaluated. This evaluation of conflicts among application exclusive configuration parameters is performed for each open data connection. If after evaluating all open data connections there are no more connections under consideration (i.e., there is an exclusive parameter conflict on every open data connection), then, provided there are sufficient communication resources available, a new data connection is opened using the configuration parameters specified by the requesting application. If there are not sufficient resources available to open another connection, then the application may full to initialize and an error may be indicated. If there are open data connections remaining for consideration (i.e., one or more data connections do not have conflicts with any exclusive parameters required by the new (i.e., requesting) application), each of the shareable parameters of the new application and all applications currently using the non-conflicting data connection are evaluated to determine a mutually acceptable configuration. The various embodiments accomplish this evaluation by computing a "union rule" which is a rule that will result in a value or setting for the parameter that is acceptable to all applications using the data connection. Each configuration parameter has a corresponding union rule so this process is repeated for each sharable parameter. At the same time, a measure of the degree to which all applications are supported by a compromise configuration parameter is determined. This measure of support can be totaled or otherwise combined across all configuration parameters to obtain a measure of how well each data connection will accommodate the new application along with other applications already using the connection. Finally, the data connection that best supports the sharable parameters of the new application (i.e., provides a best fit to shareable parameter requirements of the new application and other applications using the data connection) is used to provide the data connection for the new application and that connection is configured using the resultant parameter values determined by the application of the parameter union rules.

The various embodiments also manage data connections to ensure they use optimized configuration parameters as applications terminate (and thus no longer use the data connection) and modify their configuration parameter requests. When an application using a data connection alone (i.e., not sharing it with other applications) terminates, the associated data connection is closed, thereby freeing up communication resources for other applications. If the terminating application was sharing a data connection, the configuration parameters are re-evaluated to determine the optimum compromise of shareable parameters for the remaining applications using the data connection and the data connection is reconfigured accordingly. When an application using a shared data connection requests a change to configuration parameters, the configuration parameters are re-evaluated to determine the optimum compromise of shareable parameters for the modified parameters plus all of the shared parameters of the other applications using the data connection and the data connection is reconfigured accordingly.

The various embodiments may be employed in a variety of wired and wireless networks, including for example a wireless network employing cellular and WIFI data communication links. By way of example, FIG. 1 shows a block diagram of a communication network 10 including the Internet 12, a cellular network, a WIFI network and a LAN communicating with a variety of computing devices, such as mobile handsets 15, 25, personal computers 13, laptop computers 23 and networked servers 22, 28, 32. As FIG. 1 illustrates, modern computing devices can access a wide variety of data communication links available, with the primary limit being the communication resources included or connected to the computing device.

Computing devices, such as personal computers 13, cellular telephones 15, and laptop computers 23 can connect to a variety of data connections such as illustrated in FIG. 1. For example, personal computers 13 may access the Internet 12 via a dial-up, telephone, cable or local area network 14 from which to which they can opt to send and receive data messages such as Internet communications. As another example, cellular telephones 15 and other mobile devices can access any cellular network by a wireless data connection to a base station 16. Base stations 16 are coupled to the cellular network infrastructure, such as call routers 18 which can route data calls to servers 22 which provide a data connection to the Internet 12. As another example, computing devices such as laptop computers 23 can connect to networks by a number of different data connections. FIG. 1 illustrates three options as the laptop 23 can access to the Internet 12 via a local area network 26 coupled to a local area network server 28 which has connections to the Internet 12. Also, the laptop 23 can access the cellular network via a cellular communication device, such as a cellular telephone 25, connected to the laptop 23, such as by a cable 24 or PCMCIA connector or a plug-in air card cellular network transceiver. In this example, the cellular telephone 25 or air card (not shown) establishes a cellular data call to a base station 16 which establishes a data connection to the Internet 12 via a server 22. Additionally, the laptop 23 may connect to a WiFi network by communicating via a WiFi wireless transceiver with a WiFi base station 30 which is connected to a server 32 that has access to the Internet 12. Although not shown explicitly, cellular telephones 15, 25 may also access networks via a WiFi transceiver establishing a wireless data connection to a WiFi base station 30, as well as cable connections to networks, such as a data cable 24 connected to a laptop 23 which is connected to a local area network 26. Thus, computing devices 13, 15, 23, 25 may have a variety of different data connections available for accessing networks and supporting applications.

In addition to networks for exchanging data among different computing devices, some computing device architectures include internal process-based devices and service providing circuitry, such as GPS receivers, and parallel processors, internal database drivers, servers, and other processor-based circuits which communicate via internal data connections which are managed in the in a manner similar to external data and network connections. Thus, the various embodiments can to apply to both internal and external data connections.

In order to determine a workable compromise of each shared parameter among a plurality of applications sharing a data connection, the various embodiments apply a parameter-specific algorithm, referred to herein as a union rule, to the respective parameter values requested by each of the applications. A union rule, which may be heuristic or formulaic, is a rule defining how particular shareable parameter values can be combined into either a compromise or a superset. A union rule takes all the values specified by sharing applications for a shareable parameter as input and runs the values through computation logic to provide a resultant value. A separate union rule is provided for each shareable parameter type.

Some parameter types may also have multiple union rules enabling different implementation to choose among the multiple rules based upon the circumstances. Applying a union rule to the parameter value requests of a plurality of applications generates a value or option selection for the particular shareable parameter. The union rule may select a value or option that is different from what some or all of the applications requested, but if the union rule is properly crafted, the selected value will not significantly impact the behavior of the application using a data connection configured based on the selected value. A separate union rule is applied to each parameter to obtain a compromise set of parameter values. The resultant set of parameter values are then used to configure the data connection that will be shared by the plurality of applications.

As an example, a union rule for the inactivity timer parameter might be: <Maximum value among the specified values is the resultant value>, where R=Resultant Value. For the situation where four applications are to share a data connection, each specifying a particular parameter value v this union rule may be restated as:

$$R_{InactivityTimer} = \{v1, v2, v3, v4\} = v1 \text{ such that } v1 \text{ is } MAX\{v1, v2, v3, v4\}.$$

In a second example, one of the union rules for the channel delay parameter might be: <Minimum value among the specified values is the resultant value>, where R=Resultant Value. For the four application situation, this union rule may be restated as:

$$R_{ChannelDelay} = \{v1, v2, v3, v4\} = v1 \text{ such that } v1 \text{ is } MIN\{v1, v2, v3, v4\}$$

The application requesting a data connection may also indicate whether the parameter is required (must be supported) or optional (nice to be supported). Other similar qualifiers can be added to indicate how important a certain parameter is for an application. If an optional parameter is specified, it may be used as a hint and a best effort may be made to support it. For example, the parameter may be ignored if that allows the application to share an already existing data connection. On the other hand, if a new data connection needs to be setup anyway because other exclusive parameters conflicts with existing data connections, then optional parameters can be supported in the configuration. Qualifiers may also be used for configuration updates as explained below. If qualifiers are not specified, then the connection manager can automatically make a decision on behalf of an application as to which shareable parameters are absolutely necessary to be supported.

Figure 2A:
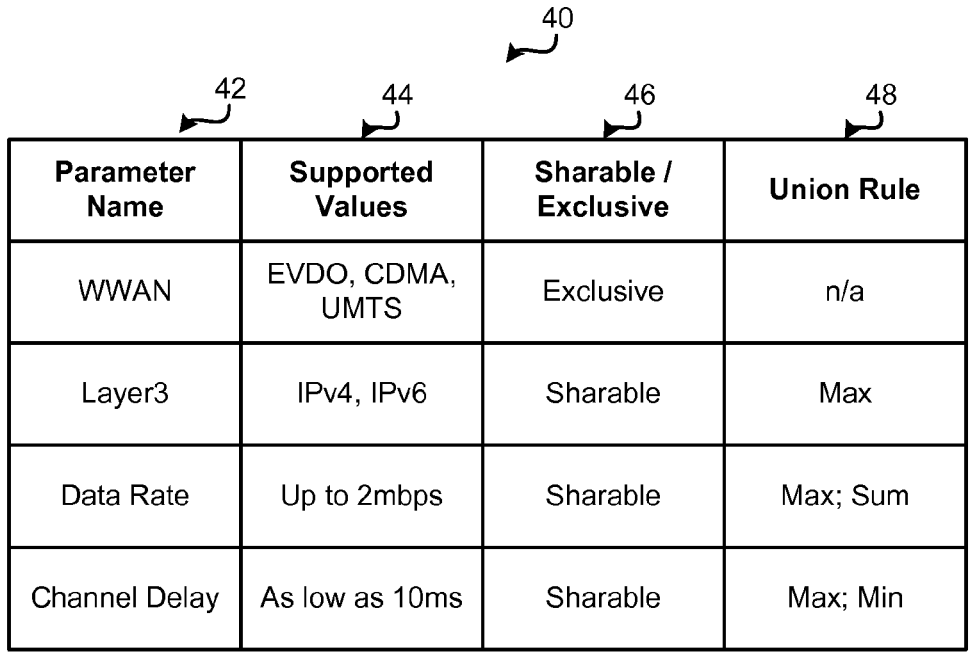
FIG. 2A is a data structure diagram of a data connection parameter data table suitable for use with various embodiments.

An example data structure for data connection configuration parameters available to applications is shown in FIG. 2A. The values shown in the data table 40 represent a subset of configuration parameters which are provided to illustrate a data structure that can be implemented in a computing device. The data table 40 may be structure as a table of data records represented as rows each comprised of data fields represented as columns. In the illustrated sample, a first data field includes a configuration parameter name 42, each of which may have multiple supported values 44, and an shareable/exclusive indication 46 (e.g., a flag or binary value) indicating whether the parameter is exclusive or shareable (i.e., able to be satisfied by a comprise or superset value). The data records may also include a union rule field 48 which, as describe more fully herein, provides a rule for determining an acceptable compromise among different parameter values requested by applications sharing a data connection. In the example illustrated in FIG. 2A only a summary name (e.g., "Min," "Max" and "Sum") for the union rules is shown, however, in some implementations the union rule itself may be included within the data table 40.

Figure 2B:
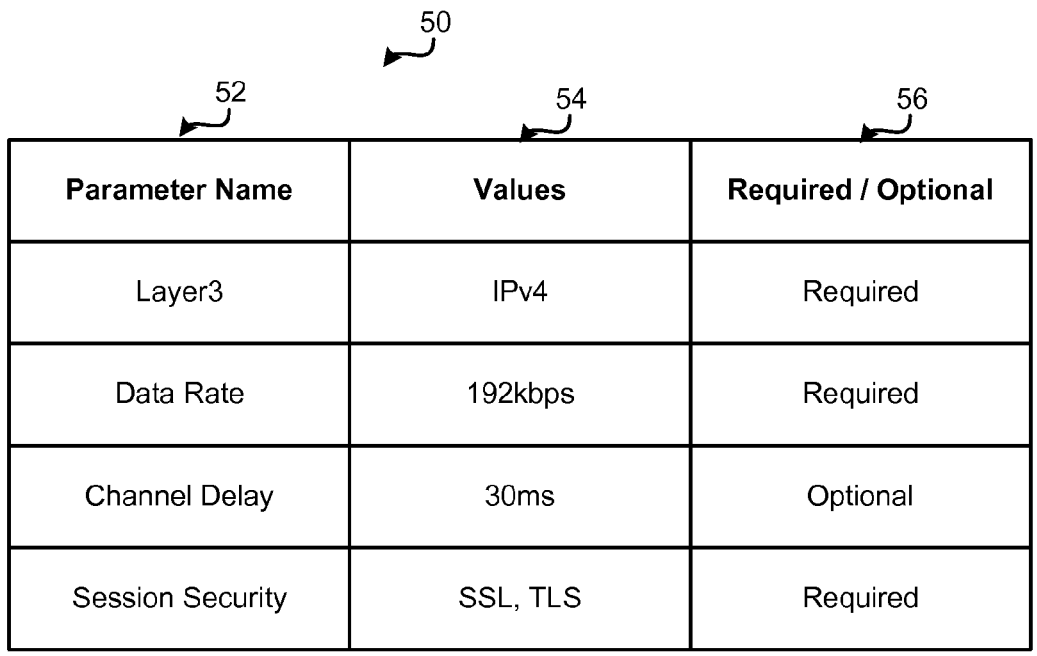
FIG. 2B is a data structure diagram of a data connection parameter data table suitable for use with various embodiments.

When an application requests a data connection it may specify the configuration parameters it needs. This specification may be in the form of a data table. Also, as described herein, the connection manager may store the requested data parameters requested by each application in a data table in memory. An example of a data table 50 of data connection configuration parameters that might be requested by an application is shown in FIG. 2B. This table shows only a subset of the configuration parameters that will typically be specified for a data connection. Each data record in the requested parameters data table 50 may include a parameter name 52, the requested value or setting 54 for that parameter, and an indication 56 of whether the parameter is optional or required by the application.

When a new application starts and requests a data connection from the system software or an already running application stops, such events may require a change to existing open data connection configuration parameters. If an open data connection is shared among multiple applications, a compromise or mutually acceptable configuration can be determined for each of the shareable configuration parameters by applying corresponding parameter union rules. The resultant values from applying union rules to the shareable parameters requested by all applications sharing an open data connection can be used to update the data connection configuration. An update to a data connection configuration parameter may be either a "local update" or a "remote update." A local update is a configuration modification which can be accomplished by the computing device's own hardware or software by changing local configuration parameters without the need to coordinate with external devices communicating via the data connection. A remote update is a configuration modification which needs to be coordinated with one or more network entities. Accomplishing remote updates require sending one or more over the air (OTA) signaling messages to one or more network entities requesting the change to the communication configuration parameter(s). Local updates are simpler and in most cases will always succeed. Remote update involves some delay as the network needs to receive the request and, if accepted, may require some time to implement. Also, remote updates may also be rejected by the network, such as if the requested update cannot be supported by the one or more network entities.

An example of a local update is the Inactivity Timer parameter which concerns processing limited to the computing device. An example of a remote update is an update to QOS parameters (such as data rates requested on the radio bearer) which require the transceiver on the other end of the communication link to coordinate any change in order to transmit and receive signals with the updated QOS parameter values. In response to a request to change QOS parameters the network may reject the update if sufficient radio resources cannot be allocated due to admission control or subscription reasons, for example.

If a remote update is rejected by the network, implementation specific actions will need to be taken. If the rejected configuration parameter was qualified as required by the new application (see FIG. 2B for example), the new application initiation is failed as the application cannot be supported because required data connection configuration cannot be provided. The specific actions may also involve notifying the application so that it may choose to request an alternate value for the rejected parameter. Additionally, actions may involve informing a user that the application cannot be activated or supported if an alternative value cannot be proposed. If the rejected configuration parameter was qualified as optional by the new application (see FIG. 2B for example), the application may still be allowed to use the data connection without the desired configuration. In this case, the application may be notified of a remote update rejection situation so the application can choose to request an alternate value for the same parameter. Alternately, the application may be configured to simply terminate when a remote update request is rejected and relinquish its request for a data connection.

The distinction between local and remote updates is not necessarily parameter-dependent as the requested parameters and the union rule may enable some updates to be accomplished locally. For example, one of the union rules for the technology preference is: <Common technology among the specified technology values is the resultant value>, where R=Resultant Value. This may be restated as $R_{InactivityTimer} = \{v1, v2, v3\} = R$ such that R is the common intersection of $\{v1, v2, v3\}$. In the example situation where v1 is ANY_WWAN, v2 is CDMA OR EVDO, and v3 is EVDO, the resultant value will be R=EVDO as EVDO is the only common value among the three requests. If a fourth application then requests a data connection with a technology parameter value of v4=UMTS, the resultant value will be R=0 or null as there are no common values among the four requests. In this case, if the data connection is already established with EVDO, then the fourth application cannot share this data connection if this parameter is indicated as required. Continuing this example, if the third application sharing the data connection terminates and the fourth application is not restarted so the only parameter values are v1 and v2, the resultant value for the union rule will be CDMA or EVDO. Since the data connection is already established with EVDO, the new configuration may allow the data connection to function in a 1×/EVDO hybrid mode where it can switch back and forth between 1× or EVDO for more flexibility and efficiency. This configuration update may be handled as a local update since no cooperation from the network is required.

In an embodiment, multiple union rules may be implemented for some shareable parameter types, depending upon how the embodiment is implemented. Allowing multiple union rules enables the connection manager to adjust to different operational situations or settings. For example, consider the data rate parameter type which defines the rate (such as in bits per second) at which an application's data can be transmitted. Such a parameter type might be provided with two different union rules, such as: use the sum of all application data rates ("sum"); and use the maximum of all data rates ("max"). (Note that a third rule might be: take the minimum data rate.) Then, depending upon factors or states in the computing device, which can depend upon a variety of operational, programming or personal selection options, one of these two union rules (i.e., sum or max) may be used when a particular application is started. To complete this example, consider the situation where new application 1 has a data rate parameter value of 64 kbps (kilobits per second) and an already running application 2 has a data rate parameter value of 128 kbps. If the sum union rule is selected at the time application 1 is started, the result of applying the union rule will be a data rate parameter value of 192 kbps. On the other hand, if the max union rule is selected at the time application 1 is started, the result will be a data rate parameter of 128 kbps. In both these examples, the data rate implemented in a communication channel used for application 1 may be greater than the data rate parameter value requested by the application. In case multiple union rules are available, the selection of which rule to apply is implementation dependent. Also, a configurable policy can be used to select the union rule that should be applied in a particular situation.

Figure 3:
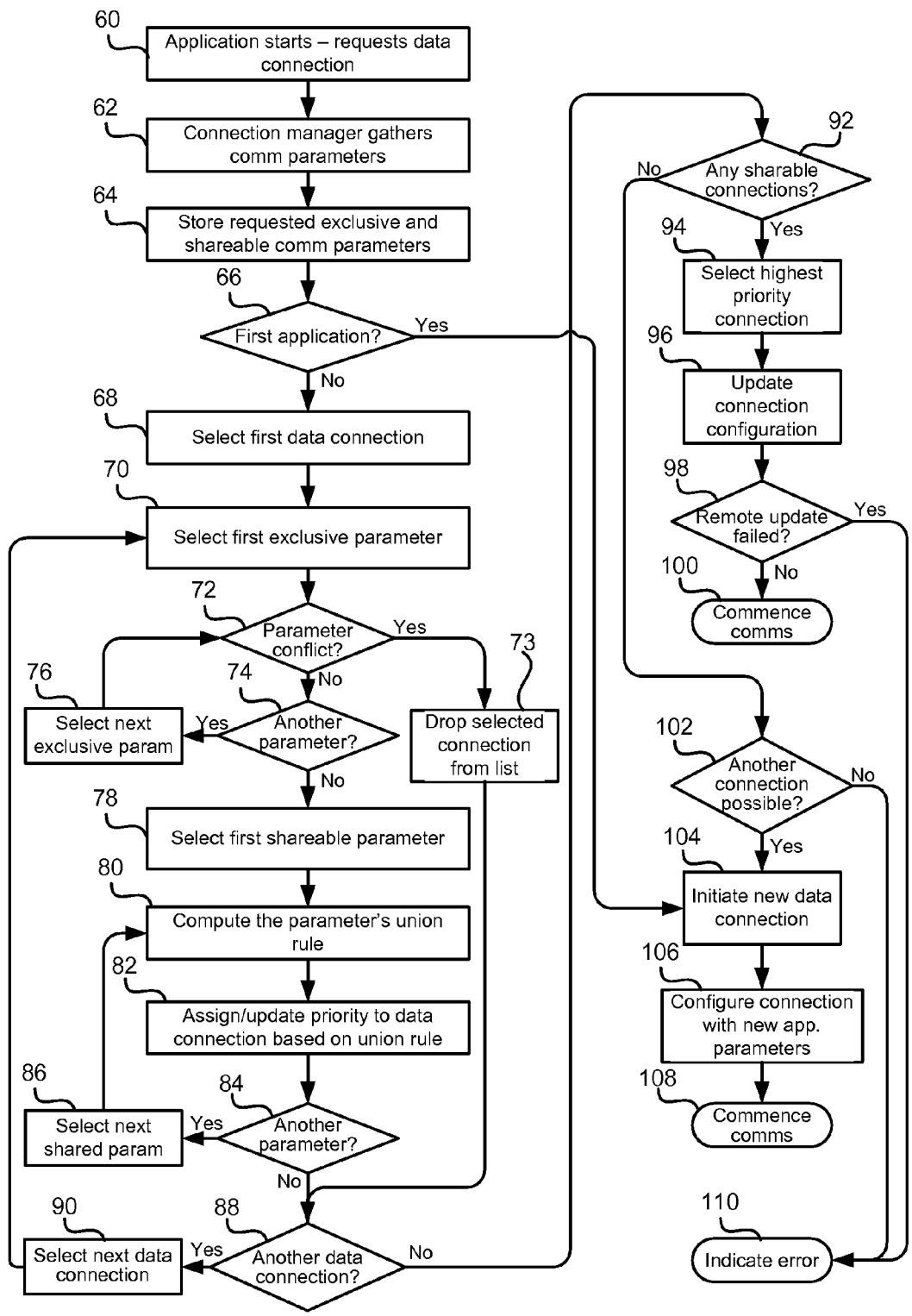
FIG. 3 is a process flow diagram of an embodiment method suitable for establishing shared data connections.

In an embodiment, a connection manager may implement a method for sharing data connections when an application starts as illustrated in FIG. 3. When a new application starts that requests a data connection, step 60, it submits a request for a data connection that specifies a number of communication configuration parameters. This data connection request may be received by a connection manager which gathers the communication parameters requested by the new application, step 62. Those requested communication parameters, including both exclusive and shareable communication parameters, may be stored in memory accessible by the system, step 64, so that they can be used in configuring the data connection and for computing the shareable parameter union rules as described more fully below. If the new application is the first application requesting a data connection, test 66, then the connection manager may simply initiate a new data connection, step 104, using the configuration parameters requested by the new application to configure the connection, step 106. Once the new data connection is established, communications by the new application can commence, step 108.

However, if the new application is not the first to establish a data connection (i.e., test 66="No"), the connection manager may execute a series of three loops to evaluate each open data connection under consideration (loop 1—steps 68-90) to determine if the new application does not conflict with any exclusive parameters of other applications using the open data connection (loop 2—steps 70-76) and, for each data connection remaining under consideration after conflicted connections are dropped from consideration, to determine a configuration for each non-conflicted data connection that will enable it to be shared by the new application (loop 3—steps 78-86).

To begin the open data connection evaluation process, the connection manager may select a first open data connection as a candidate among the connections under consideration, the step 68, and select the first requested configuration parameter for evaluation, step 70. In step 70 the selected requested configuration parameter is compared to the corresponding exclusive parameters requested by other applications currently sharing the selected data connection candidate to determine whether the parameters conflict, test 72. If an exclusive parameter of the new application conflicts with an exclusive parameter of an application already using the selected open data connection candidate, this means that the data connection candidate cannot be shared by the new application. As described above, a conflict in exclusive parameters can occur when the new application requests a required parameter that is incompatible with a parameter required by an application already using the open data connection candidate. For example, if the open data connection candidate is configured for EVDO communication technology, as required by a currently executing application, and the new application requires the data connection to be configured for CDMA communication technology, these two required parameters are incompatible and thus a conflict exists (i.e., test 72 will be "Yes"). In the event of a conflict in exclusive parameters (i.e., test 72="Yes"), the connection manager may remove the conflicted open data connection from the list of connections under consideration, step 73, and proceed to evaluate the next open data connection as a candidate by jumping to test 88 described below. If, however, the selected exclusive parameter does not conflict with corresponding parameters required by applications already using the open data connection candidate (i.e., test 72="No"), the configuration manager may determine whether there is another exclusive parameter to be evaluated, test 74. If there is another exclusive parameter to be evaluated (i.e., test 74="Yes"), the connection manager may select the next exclusive parameter for evaluation, step 76, before returning to evaluate whether the selected exclusive parameter conflicts with exclusive parameters required by applications already using the open data connection candidate, returning to test 72.

Once all exclusive parameters have been evaluated (i.e., test 74="No"), the connection manager may then select the first shareable parameter for evaluation, step 78. Using the selected requested shareable parameter as well as the corresponding parameters of applications already using the selected open data connection candidate, the connection manager may then compute the union rule associated with that particular parameter, step 80. As described above, applying the union rule to be various applications' requested parameter values results in identifying a compromise or superset parameter value that will enable the open data connection candidate to be shared by the current and new applications. The computed union rule resultant value may be stored in memory for use later in configuring the open data connection candidate. Additionally, based upon the degree to which the result of the union rule satisfies the parameter requests of the new and currently executing applications that would share the selected open data connection candidate a priority or quality value may be assigned to the open data connection candidate, step 82. As described below, the priority or quality assigned to the open data connection candidate based upon the union rule resultant value for the selected parameter will be combined with priority or quality values assigned to all of the shareable parameters to determine an overall ranking or priority for the selected open data connection candidate that can be used to select a particular open data connection to be assigned to the new application. The connection manager may then proceed to the next shareable parameter by determining whether there is another shareable parameter to be evaluated, test 84, and if so, to select the next shareable parameter, step 86, before returning to step 80 where the corresponding union rule is applied to the selected parameter.

Once all of the shareable parameters have been evaluated (i.e., test 84="No"), the connection manager may proceed to the next open data connection remaining under consideration by determining whether there is another open data connection under consideration to be evaluated as a candidate, test 88, and if so, to select the next open data connection as the data connection candidate, test 90, and repeat the parameter evaluation process by returning to step 70 where the first exclusive parameter is selected for evaluation.

Once all of the open data connections have been evaluated (i.e., test 88="No") and conflicted connections removed from consideration, the connection manager may determine whether there are any shareable open data connections remaining for consideration, test 92. A shareable open data connection will exist if there was no conflict among exclusive parameters in at least one data connection (i.e., test 72="No" for at least one data connection). If the evaluation of open data connections revealed that open connection could be shared (i.e., there are no open data connections remaining under consideration so test 92="No"), the connection manager may determine whether there are sufficient communication resources to open another data connection, test 102. If there are sufficient resources (i.e., test 102="Yes"), the connection manager may then proceed to initiate a new data connection, step 104, using the configuration parameters requested by the new application to configure the new connection, step 106.

Once the new data connection is established communications by the new application can commence, step 108. However, if there are insufficient resources to open another data connection (i.e., test 102="No"), initialization of the new application may be failed and an error message returned by the system, step 110.

If the evaluation of open data connections revealed that one or more data connection could be shared (there is at least one open data connections remaining under consideration so i.e., test 92="Yes"), connection manager may select the open data connection with the highest priority or quality value as a candidate for assignment to the new application, step 94. This selection may be based upon the priority or quality values assigned to each of the various open data connections for each of the shared parameters in step 82. The configuration of the selected open data connection is then updated in step 96 to implement all of the shared parameter resultant values determined for the selected data connection in step 80. This step, if successfully completed, enables the new application to begin sharing the selected open data connection.

Since the open data connection configuration update may require cooperation from a network node, i.e., at least one parameter involves a remote update, the connection manager may test whether the remote update failed (i.e., was rejected by the network) or succeeded (i.e., was accepted and implemented by the network), test 98. If the remote update succeeded (i.e., test 98 ="No") communications by the new application can commence, step 100. However, if the remote update failed i.e., test 98="Yes"), initialization of the new application may be failed and an error message returned by the system, step 110. If all the configuration parameters being updated involve local updates (i.e., are implemented within the computing device itself), test 98 may be bypassed.

While FIG. 3 illustrates a method in which the exclusive parameters are evaluated before shareable parameters, an alternative method could evaluate each of the configuration parameters in turn regardless of whether they are exclusive or shareable. This alternative embodiment would combine the second and third loops into a single recursive analysis of all of the communication parameters. If any exclusive parameter conflicts (i.e., test 72="Yes"), then the evaluation of configuration parameters would end for that particular open data connection candidate with the process jumping to consider the next open data connection candidate, such as by moving to step 88. The disadvantage of this alternative method is that some additional processing may be involved in applying union rules to shareable parameters if a subsequent configuration parameter turns out to be exclusive and conflicted.

A pseudo code implementation of an alternative embodiment method for sharing data connections when an application starts is as follows:
1. When a new application starts, gather its specified exclusive and shareable parameters.
2. Enumerate over each available/established data connection:
   a. Does any of the specified exclusive parameters conflict with the exclusive parameters used by this data connection?
      i. If yes, skip to next available data connection, go to step 2a.
      ii. If not, go to step 2b.
   b. For each shareable parameter specified:
      i. Compute the new resultant value based on the union rule for this parameter considering new and existing values.
      ii. Assign/update priority to this data connection based on how well the resultant value can be supported.
   c. Evaluate next data connection, go to step 2a.
3. Pick the data connection with highest priority from the candidate set, if one exists.
   a. Update configuration of the data connection based on new resultant values (local or remote) for all shareable parameters that are required.
   b. If remote updates failed for required parameters, indicate error to application
4. If candidate data connection set is empty, initiate a new data connection if enough resources are available.
   a. Configure the new data connection with exclusive and shareable parameters specified by the application.
   b. Store the exclusive and shareable parameters specified by this application The embodiments also can update an open data connection configuration when an application sharing the data connection terminates. Doing so allows the data connection configuration to be optimized for the applications currently sharing the open data connection, as well as simplifying the process of applying union rules when another application requests a data connection.

Figure 4:
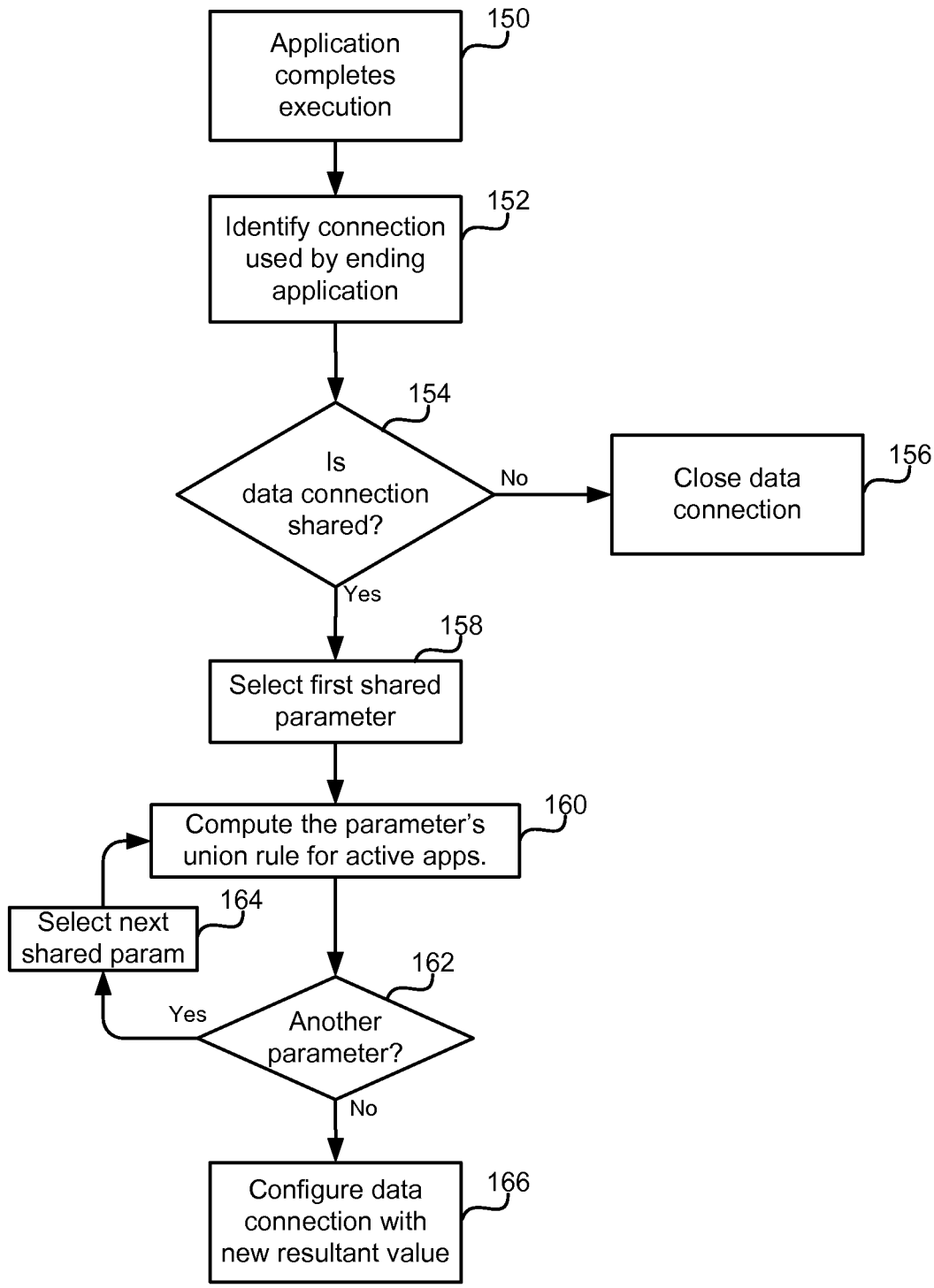
FIG. 4 is a process flow diagram of an embodiment method suitable for managing a shared data connection when an application terminates.

FIG. 4 is a process flow diagram of example steps that may be implemented in an embodiment to update an open data connection when an application terminates. When an application using a data connection terminates, step 150, the connection manager identifies the data connection used by the application, step 152, and determines if the connection is being shared by multiple applications, test 154. If the data connection is not being shared (i.e., test 154="No"), the connection manager may close the connection, step 156. If the data connection is being shared (i.e., test 154="Yes"), the connection manager may select a first shareable parameter, step 158, and apply the corresponding union rule to the parameter values requested by the remaining applications sharing the open data connection, step 160. This process is repeated for each of the shared parameters by the connection manager determining if there is another shared parameter to evaluate, test 162, and if so selecting the next shared parameter, step 164, before returning to step 160 to apply the corresponding union rule to the selected parameter. Once all of the shared parameters have been so evaluated (i.e., test 162="No"), the data connection configuration is updated with the resultant parameter values. In an embodiment, the configuration manager may test whether only a single application remains using the open data connection after the terminating application is removed from the connection, and if so, bypass the loop of applying union rules and move directly to updating the data connection configuration using the parameters requested by the remaining application. Additionally, the connection manager may test whether any remote updates implemented as part of step 166 were successful, by implementing steps similar to step 98 as described above with reference to FIG. 3.

A pseudo code implementation of an embodiment method for managing a data connection configuration when an application terminates is as follows:
1. When an already executing application terminates,
   a. Identify the data connection being used by this application
   b. Retrieve exclusive and shareable parameters specified by the terminating application at the time when it was started.

2. If this is the only application using the data connection, then close the data connection.
3. If other applications are sharing the data connection,
   a. For each shareable parameter specified by the application
      i. Compute the resultant value of the parameter using the union rule considering all the specified values excluding the one specified by the terminating application
      ii. Configure the data connection with the new resultant value (local or remote).

Figure 5:
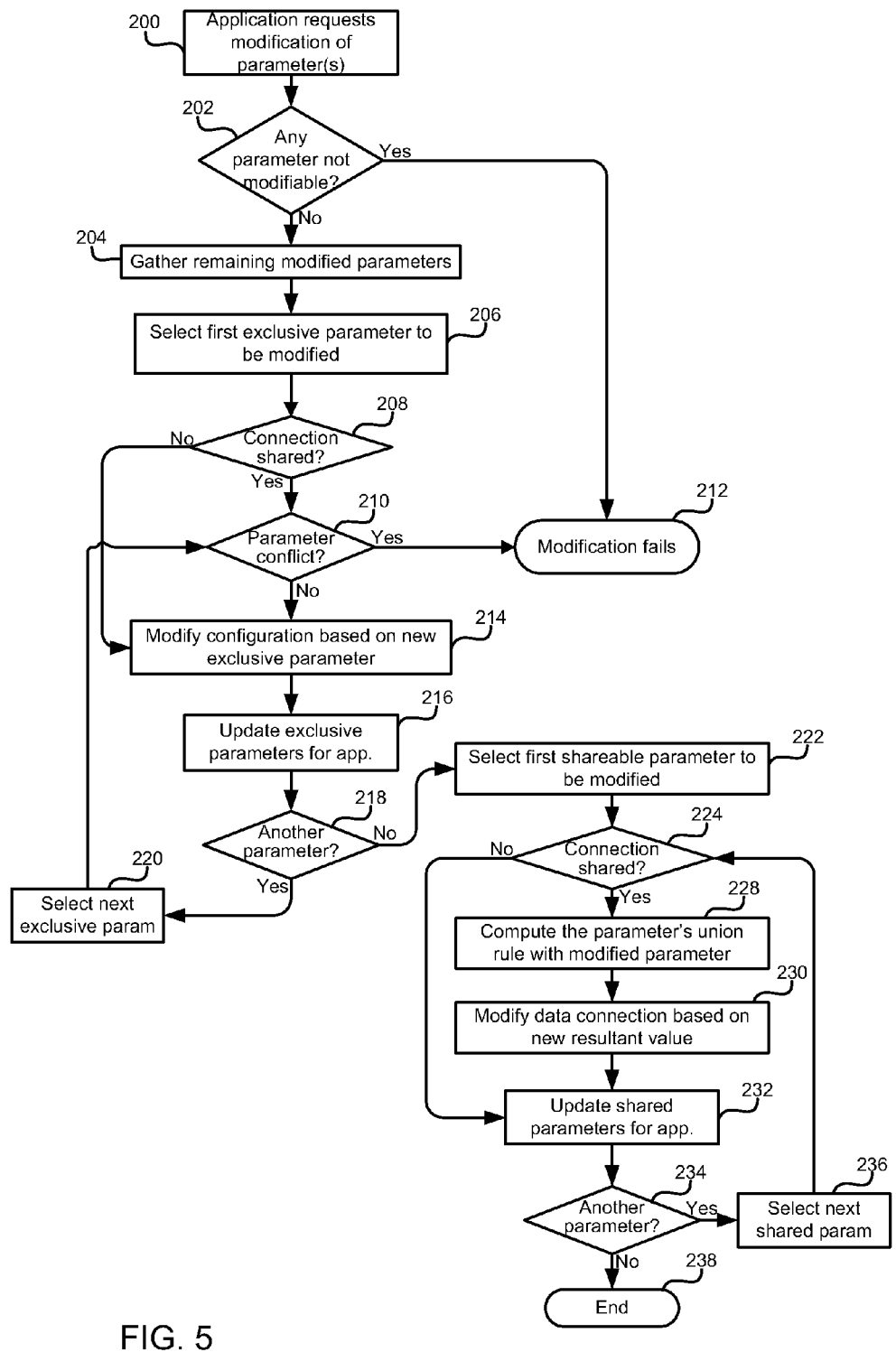
FIG. 5 is a process flow diagram of an embodiment method suitable for managing a data connection when an application using the data connection requests modified communication parameters.

The embodiments also can update a data connection configuration when an application sharing the connection requests a change to one or more of the configuration parameters, an example method for which is illustrated in the process flow diagram shown in FIG. 5. When an application requests a change or modification to a data connection configuration parameter or parameters, step 200, the connection manager may determine if the particular parameter or parameters cannot be modified, test 202. If any of the selected parameter or parameters cannot be modified (i.e., test 202="Yes") the modification request fails, step 212, which may be communicated to the application in a rejection or failure notification.

If all parameters for which a modification is requested can be modified (i.e., test 202="No"), the connection manager may gather the modified parameter value requests, step 204. Each parameter to be modified is evaluated in a loop that may commence by the connection manager selecting a first modified exclusive parameter for evaluation, step 206. If there are no exclusive parameters to be modified the connection manager may jump to step 222 to begin evaluating shareable parameters. If the data connection is shared (i.e., by the application requesting the modification plus at least one other application), test 208, the connection manager may determine whether the requested parameter modification conflicts with a corresponding exclusive parameter required by the other application(s) sharing the data connection, test 210. If the selected exclusive parameter to be modified conflicts with required parameter values of other applications using the data connection (i.e., test 210="Yes"), the modification request fails, step 212, which may be communicated to the application in a rejection or failure notification.

If the selected exclusive parameter to be modified does not conflict with required parameter values of other applications using the data connection (i.e., test 210="No") the data connection configuration may be updated based on the selected modified exclusive parameter, step 214. Also, if the data connection associated with the application modifying one or more parameters is not shared with another application (i.e., test 208="No"), the data connection configuration may be updated based on the selected modified exclusive parameter, step 214. The stored parameter value requests for the application are also updated with the modified exclusive parameter, step 216.

This process is repeated for each of the exclusive parameters being modified by testing whether there is another modified exclusive parameter, test 218, and if so, selecting the next modified exclusive parameter, step 220, before returning to step 210 to determine if the parameter modification conflicts with a corresponding parameter required by the other application(s) sharing the data connection.

Once all exclusive parameters for which a modification is requested have been evaluated (i.e., test 218="No"), the connection manager may select a first sharable parameter requested to be modified, step 222. If the data connection is shared (i.e., by the application requesting the modification plus at least one other application), test 224, the connection manager may apply the union rule associated with the selected sharable parameter to the requested modified parameter and the requested parameters of all applications sharing the data connection, step 228. The union rule resultant value is then used to modify the data connection configuration, step 230. The stored parameter value requests for the application are also updated with the modified exclusive parameter, step 232.

This process is repeated for each of the shareable parameters being modified by testing whether there is another modified shareable parameter, test 234, and if so, selecting the next modified shareable parameter, step 236, before returning to step 228 to apply the corresponding union rule to the selected shareable parameter and the parameters requested by the other application(s) sharing the data connection. Once all shareable parameters have been evaluated (i.e., step 234="No") the modification process ends, step 238.

Figure 6:
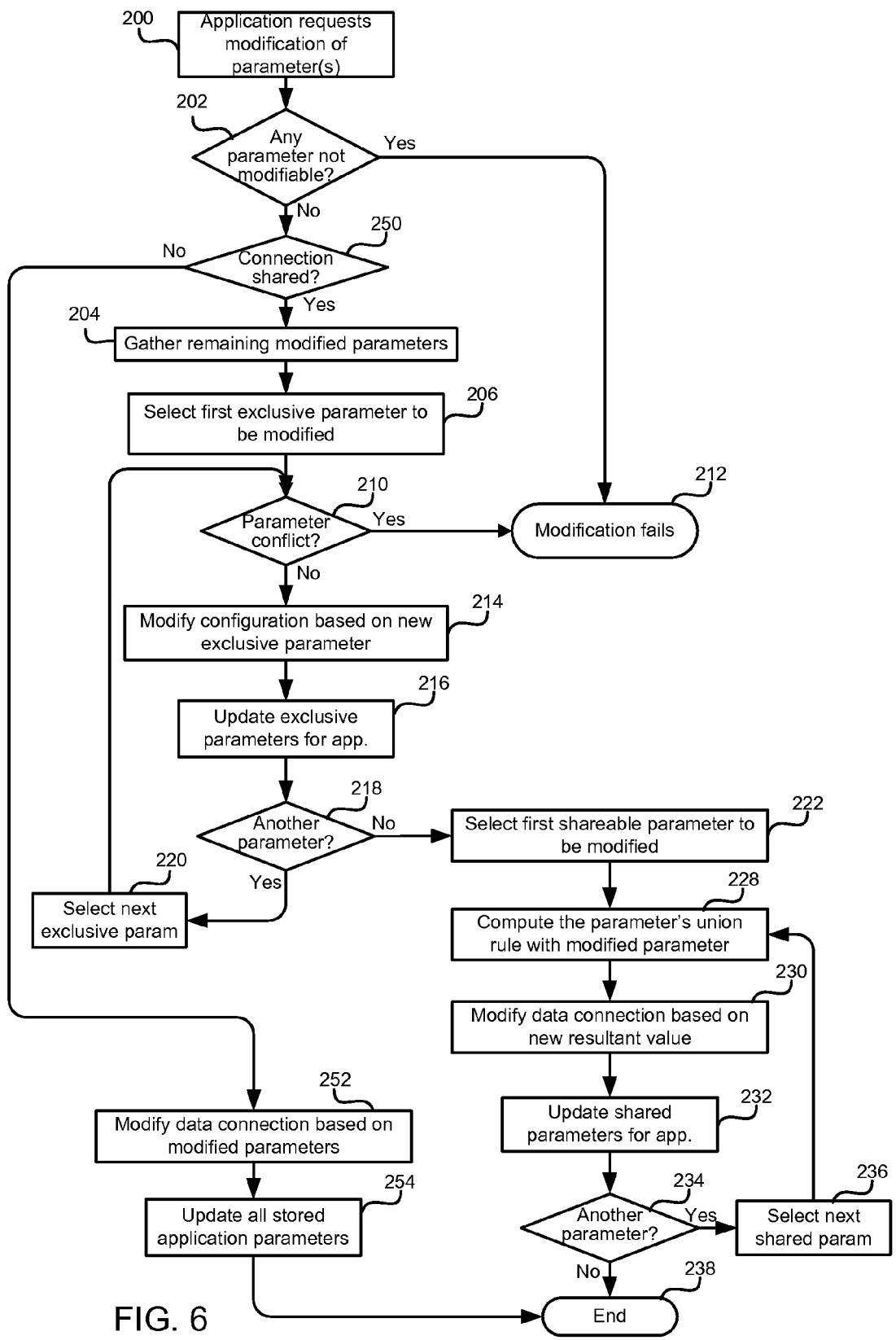
FIG. 6 is a process flow diagram of an alternative embodiment method suitable for managing a data connection when an application using the data connection requests modified communication parameters.

FIG. 6 is a process flow diagram illustrating an alternative embodiment method for updating a data network connection configuration when an application requests a change to configuration parameters. The method illustrated in FIG. 6 is similar to the method illustrated in FIG. 5 with the exception that a preliminary test 250 may be implemented to determine whether the concerned data connection is shared or used solely by the application requesting the configuration change. If the data connection is shared (i.e., test 250="Yes"), the connection manager proceeds with the evaluation and configuration steps 204-238 as described above with reference to FIG. 5. However, if the data connection is not shared, and thus is used only by the application requesting a modification to the configuration parameter(s) (i.e., test 250="No"), the connection manager may proceed to modify the data connection based upon the requested modified configuration parameters, step 252. Then the stored data connection parameter requests of the application are updated to include the modified configuration parameters, step 254, before the modification routine ends, step 238.

In a further embodiment, an implementation may choose to modify the data connection configuration such that either all or none of the requested parameters are modified. In such an embodiment, for example, a preliminary determination may be made regarding whether the requested change to the configuration is required or will involve a large number of parameters. If the change is optional or involves only one or a few parameters, the connection manager may opt to not modify the configuration in order to avoid disrupting data communications of the applications sharing the open data connection. Alternatively, if the change is required or involves a large number of parameters, the connection manager may opt to calculate all union rules and update all parameters in the configuration accordingly.

A pseudo code implementation of an embodiment method for managing a data connection configuration when an application requests a change to the configuration is as follows:
1. When an already executing application modifies the configuration it requested earlier,
   a. Analyze the new configuration parameters.
   b. If any of the parameters are not modifiable, reject the operation.
   c. Gather the remaining parameters for modification.
2. For each exclusive parameter to be modified
   a. If the data connection is shared, modify exclusive parameter only if it does not conflict with other apps using the same data connection, otherwise reject the operation.

b. If the data connection is exclusively used by this application only, modify the configuration based on new exclusive parameter (local and remote)
c. Update the new exclusive parameter set for this app.
3. For each shareable parameter to be modified
a. If the data connection is shared, Compute the new resultant value based on the union rule for this parameter considering new and existing values and excluding previous value from this app.
b. If the data connection is exclusively used by this application only, new resultant value is same as the parameter value specified by the app.
c. Modify the configuration of the data connection based on new resultant value (local or remote)
d. Update the new shareable parameter set for this app.

The various embodiments can be extended to support any type of application and is not limited to data applications. Also, as described above, the various embodiments can be utilized for data can connections using any type of networks, including wired and wireless networks. Thus, even though some of the embodiment description address parameters unique to wireless communications, the scope of the present invention and the claims should not be limited to wireless network implementations. The various configuration parameters listed herein is for exemplary purpose only, other configuration parameters may be used and each network technology may use different parameters or only a subset of the parameters described herein.

Figure 7:
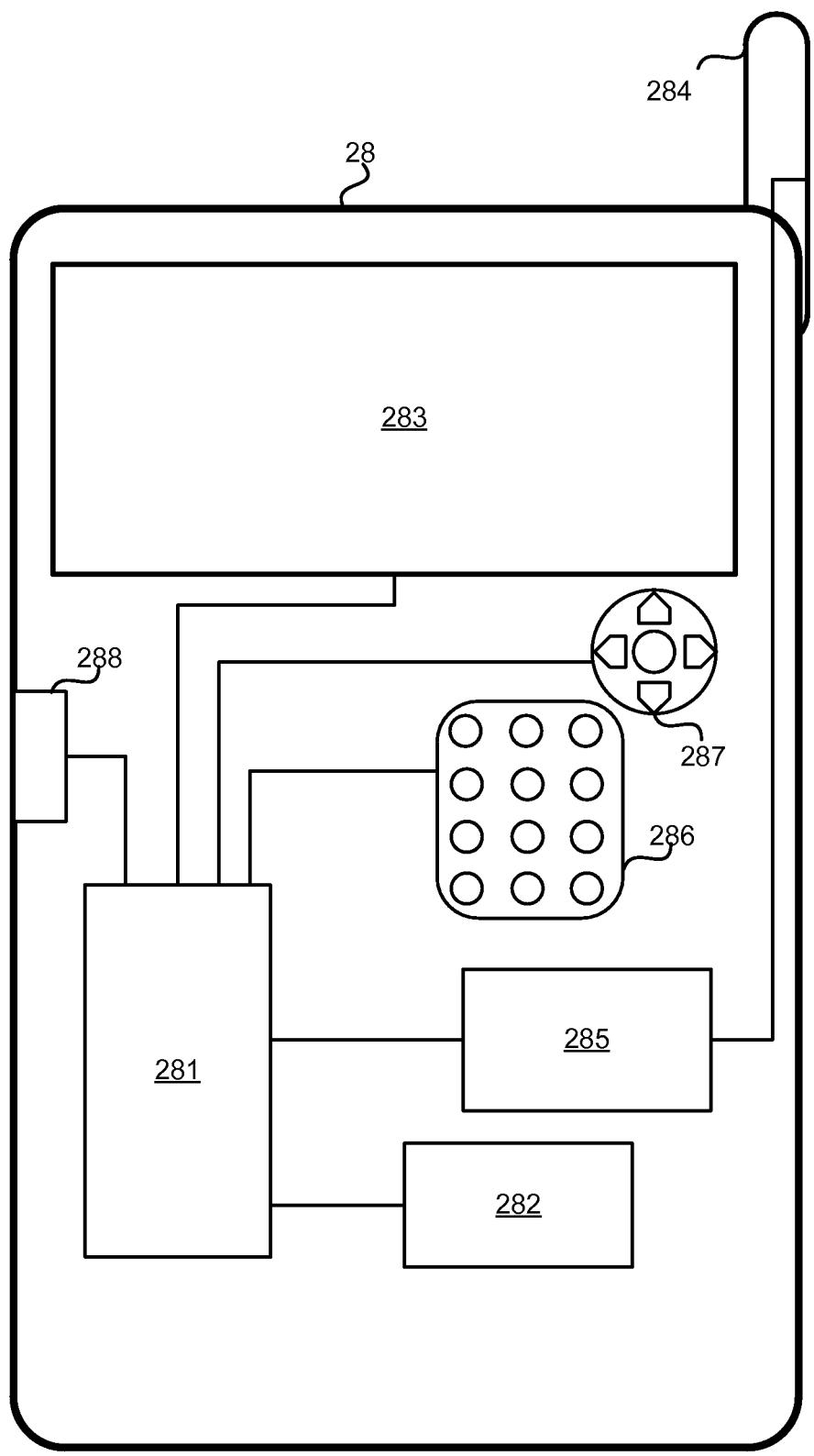
FIG. 7 is a circuit block diagram of an example computing device suitable for use with the various embodiments.

The embodiments described above may be implemented on any of a variety of portable computing devices, such as, for example, cellular telephones, personal data assistants (PDA) with cellular telephone and/or WIFI transceivers, mobile electronic mail receivers, mobile web access devices, and other processor-equipped devices that may be developed in the future that connect to on or more data connections. Typically, such portable computing devices will have in common the components illustrated in FIG. 7. For example, the portable computing devices 28 may include a processor 281 coupled to internal memory 282 and a display 283. Additionally, the portable computing device 28 will have an antenna 284 for sending and receiving electromagnetic radiation that is connected to a wireless data link and/or cellular telephone transceiver 285 coupled to the processor 281. In some implementations, the transceiver 285 and portions of the processor 281 and memory 282 used for cellular telephone communications is referred to as the air interface since it provides a data interface via a wireless data link. Portable computing device 28 also typically include a key pad 286 or miniature keyboard and menu selection buttons or rocker switches 287 for receiving user inputs. The processor 281 may further be connected to a wired network interface 288 such as a universal serial bus (USB) or FIREWIRE® connector socket for connecting the processor 281 to an external computing device such as a personal computer 13, 23 or external local area network.

The processor 281 may be any programmable microprocessor, microcomputer or multiple processor chip or chips that can be configured by software instructions (applications) to perform a variety of functions, including the functions of the various embodiments described above. In some portable computing device 28, multiple processors 281 may be provided, such as one processor dedicated to wireless communication functions and one processor dedicated to running other applications. Typically, software applications may be stored in the internal memory 282 before they are accessed and loaded into the processor 281. In some portable computing device 28, the processor 281 may include internal memory sufficient to store the application software instructions. For the purposes of this description, the term memory refers to all memory accessible by the processor 281, including internal memory 282 and memory within the processor 281 itself. Application data files are typically stored in the memory 282. In many portable computing device 28, the memory 282 may be a volatile or nonvolatile memory, such as flash memory, or a mixture of both.

Figure 8:
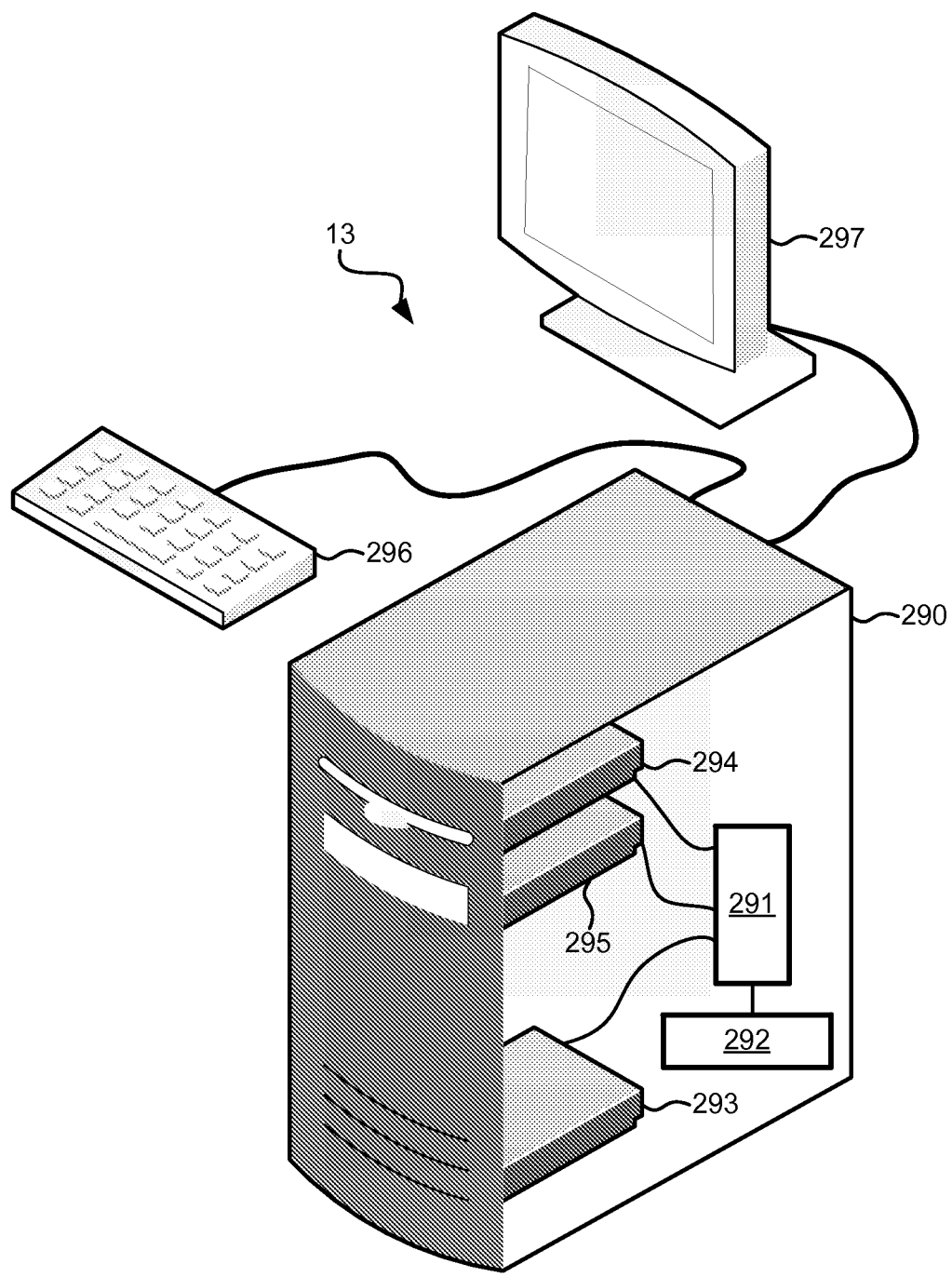
FIG. 8 is a circuit block diagram of an example personal computer suitable for use with the various embodiments.

The embodiments described above may also be implemented on any of a variety of computing devices, such as, for example a personal computer 13 illustrated in FIG. 8. Such a personal computer 13 typically includes a computer housing 290, a processor 291 coupled to volatile memory 292 and a large capacity nonvolatile memory, such as a disk drive 293. The computer 13 may also include a floppy disc drive 294 and a compact disc (CD) drive 295 coupled to the processor 291. Typically the computer device 13 will also include a user input device like a keyboard 296 and a display 297. The computer device 13 may also include a number of connector ports coupled to the processor 291 for establishing data connections or receiving external memory devices, such as a USB or FIREWIRE® connector sockets (not shown), as well as network connection circuits (not shown) for coupling the processor 291 to a network. In a laptop configuration 23, the computer housing 290 includes the keyboard 296 and the display 297 as is well known in the computer arts.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order.

In the context of the invention, the method may be implemented by operating portion(s) of the wireless network to execute a sequence of machine-readable instructions. The hardware used to implement the foregoing embodiments may be processing elements and memory elements configured to execute a set of instructions, including microprocessor units, microcomputer units, programmable floating point gate arrays (FPGA), and application specific integrated circuits (ASIC) as would be appreciated by one of skill in the art, wherein the set of instructions are for performing method steps corresponding to the above methods. For example, operating portions could be a portable computer, a cellular telephone, a personal digital assistant, or a navigation device. Alternatively, some steps or methods may be performed by circuitry that is specific to a given function.

Those of skill in the art would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in processor readable data storage media or memory circuit which may be any of RAM memory, flash memory, ROM memory, EPROM memory, EEPROM memory, registers, as non-volatile storage (e.g., a conventional "hard drive" or a RAID array), magnetic tape, a removable disk, an optical storage device (e.g. CD-ROM, DVD, digital optical tape), paper "punch" cards, or other suitable data storage media including digital and analog transmission media known in the art or that will be developed. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or computing device. In the alternative, the processor and the storage medium may reside as discrete components in a user terminal or computing device. Additionally, in some aspects, the steps and/or actions of a method or algorithm may reside as one or any combination or set of codes and/or instructions on a machine readable medium and/or computer readable medium, which may be incorporated into a computer program product.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

I claim:

1. A method for supporting a plurality of applications using one of a plurality of open data connections characterized by exclusive and shareable configuration parameters, comprising:
    gathering exclusive and shareable configuration parameters specified by a new application requesting a data connection;
    applying, for each open data connection of the plurality of open data connections, a parameter-specific union rule to each shareable configuration parameter specified by the new application and to each shareable configuration parameter specified by another application using the open data connection to determine a resultant parameter value for each shareable configuration parameter;
    selecting one open data connection from among the plurality of open data connections based upon exclusive configuration parameters and resultant parameter values for each of the shareable configuration parameters; and
    assigning the selected one open data connection to the application.

2. The method of claim 1, further comprising:
    assigning a priority to each of the plurality of open data connections based on the determined resultant parameter values;
    selecting the one open data connection with a highest assigned priority for assignment to the new application; and
    configuring the assigned open data connection using the resultant parameter values determined for the open data connection with the highest assigned priority.

3. The method of claim 2, further comprising:
    determining for each open data connection of the plurality of open data connections whether any exclusive configuration parameters specified by the new application conflicts with exclusive configuration parameters specified by another application using the selected data connection;
    removing from consideration any selected open data connection for which a configuration parameter requested by the new application conflicts with an exclusive parameter specified by another application using that selected open data connection; and
    establishing a new data connection if all open data connections are removed from consideration as a result of conflicting exclusive requirements.

4. The method of claim 2, further comprising:
    reapplying the parameter-specific union rules to the shareable configuration parameters specified by applications sharing the assigned one data connection when an application sharing the assigned one data connection terminates; and
    reconfiguring the assigned one data connection based upon resultant parameter values obtained from the reapplication of the parameter-specific union rules to the shareable configuration parameters.

5. The method of claim 2, further comprising:
    receiving a request from a first application sharing the assigned one data connection to modify one or more of the shareable configuration parameter values;
    applying the parameter-specific union rules to the one or more shareable configuration parameter values and to corresponding configuration parameter values of each other application sharing the assigned one data connection, wherein modified resultant configuration parameter values are determined: and
    updating the assigned one data connection configuration using the determined modified resultant configuration parameter values.

6. The method of claim 2, wherein the priority assigned to the selected open data connection based on the determined resultant parameter values represents a degree to which the determined resultant parameter values support all applications sharing the selected open data connection.

7. The method of claim 1, further comprising:
    receiving a request from a first application sharing the assigned one data connection to modify one or more exclusive configuration parameter values;
    determining whether the modified one or more exclusive configuration parameter values conflicts with corresponding exclusive configuration parameters specified by another application using the assigned one data connection; and
    rejecting the request from the first application to modify one or more exclusive configuration parameter values in response to determining that any modified exclusive configuration parameter value conflicts with a corresponding exclusive configuration parameter specified by another application using the assigned one data connection.

8. A mobile device, comprising:
    a processor;
    a memory coupled to the processor;
    wherein the processor is configured with processor-executable instructions to perform steps comprising:
        gathering exclusive and shareable configuration parameters specified by a new application requesting a data connection;
        applying, for each open data connection of the plurality of open data connections, a parameter-specific union rule to each shareable configuration parameter specified by the new application and to each shareable configuration parameter specified by another application using the open data connection to determine a resultant parameter value for each shareable configuration parameter;

selecting one open data connection from among the plurality of open data connections based upon exclusive configuration parameters and resultant parameter values for each of the shareable configuration parameters; and assigning the selected one open data connection to the application.

9. The mobile device of claim 8, wherein the processor is configured with processor-executable instructions to perform steps further comprising:

assigning a priority to each of the plurality of open data connections based on the determined resultant parameter values;

selecting the one open data connection with a highest assigned priority for assignment to the new application; and configuring the assigned open data connection using the resultant parameter values determined for the open data connection with the highest assigned priority.

10. The mobile device of claim 9, wherein the processor is configured with processor-executable instructions to perform steps further comprising:

determining for each open data connection of the plurality of open data connections whether any exclusive configuration parameters specified by the new application conflicts with exclusive configuration parameters specified by another application using the selected data connection;

removing from consideration any selected open data connection for which a configuration parameter requested by the new application conflicts with an exclusive parameter specified by another application using that selected open data connection; and establishing a new data connection if all open data connections are removed from consideration as a result of conflicting exclusive requirements.

11. The mobile device of claim 9, wherein the processor is configured with processor executable instructions to perform steps further comprising:

reapplying the parameter-specific union rules to the shareable configuration parameters specified by applications sharing the assigned one data connection when an application sharing the assigned one data connection terminates; and reconfiguring the assigned one data connection based upon resultant parameter values obtained from the reapplication of the parameter-specific union rules to the shareable configuration parameters.

12. The mobile device of claim 9, wherein the processor is configured with processor executable instructions to perform steps further comprising:

receiving a request from a first application sharing the assigned one data connection to modify one or more of the shareable configuration parameter values;

applying the parameter-specific union rules to the one or more shareable configuration parameter values and to corresponding configuration parameter values of each other application sharing the assigned one data connection, wherein modified resultant configuration parameter values are determined: and updating the assigned one data connection configuration using the determined modified resultant configuration parameter values.

13. The mobile device of claim 9, wherein the processor is configured with processor executable instructions to perform steps so the priority assigned to the selected open data connection based on the determined resultant parameter values represents a degree to which the determined resultant parameter values support all applications sharing the selected open data connection.

14. The mobile device of claim 8, wherein the processor is configured with processor executable instructions to perform steps further comprising:

receiving a request from a first application sharing the assigned one data connection to modify one or more exclusive configuration parameter values;

determining whether the modified one or more exclusive configuration parameter values conflicts with corresponding exclusive configuration parameters specified by another application using the assigned one data connection; and rejecting the request from the first application to modify one or more exclusive configuration parameter values in response to determining that any modified exclusive configuration parameter value conflicts with a corresponding exclusive configuration parameter specified by another application using the assigned one data connection.

15. A mobile device, comprising:

means for gathering exclusive and shareable configuration parameters specified by a new application requesting a data connection on the mobile device;

means for applying, for each open data connection of the plurality of open data connections, a parameter-specific union rule to each shareable configuration parameter specified by the new application and to each shareable configuration parameter specified by another application using the open data connection to determine a resultant parameter value for each shareable configuration parameter;

means for selecting one open data connection from among the plurality of open data connections based upon exclusive configuration parameters and resultant parameter values for each of the shareable configuration parameters; and means for assigning the selected one open data connection to the application executing on the mobile device.

16. The mobile device of claim 15, further comprising:

means for assigning a priority to each of the plurality of open data connections based on the determined resultant parameter values;

means for selecting the one open data connection with a highest assigned priority for assignment to the new application; and means for configuring the assigned open data connection using the resultant parameter values determined for the open data connection with the highest assigned priority.

17. The mobile device of claim 16, further comprising:

means for determining for each open data connection of the plurality of open data connections whether any exclusive configuration parameters specified by the new application conflicts with exclusive configuration parameters specified by another application using the selected data connection;

means for removing from consideration any selected open data connection for which a configuration parameter requested by the new application conflicts with an exclusive parameter specified by another application using that selected open data connection; and means for establishing a new data connection if all open data connections are removed from consideration as a result of conflicting exclusive requirements.

18. The mobile device of claim 16, further comprising:
means for reapplying the parameter-specific union rules to the shareable configuration parameters specified by applications sharing the assigned one data connection when an application sharing the assigned one data connection terminates; and
means for reconfiguring the assigned one data connection based upon resultant parameter values obtained from the reapplication of the parameter-specific union rules to the shareable configuration parameters.

19. The mobile device of claim 16, further comprising:
means for receiving a request from a first application sharing the assigned one data connection to modify one or more of the shareable configuration parameter values;
means for applying the parameter-specific union rules to the one or more shareable configuration parameter values and to corresponding configuration parameter values of each other application sharing the assigned one data connection, wherein modified resultant configuration parameter values are determined; and
means for updating the assigned one data connection configuration using the determined modified resultant configuration parameter values.

20. The mobile device of claim 16, wherein the priority assigned to the selected open data connection based on the determined resultant parameter values represents a degree to which the determined resultant parameter values support all applications sharing the selected open data connection.

21. The mobile device of claim 15, further comprising:
means for receiving a request from a first application sharing the assigned one data connection to modify one or more exclusive configuration parameter values
means for determining whether the modified one or more exclusive configuration parameter values conflicts with corresponding exclusive configuration parameters specified by another application using the assigned one data connection; and
means for rejecting the request from the first application to modify one or more exclusive configuration parameter values in response to determining that any modified exclusive configuration parameter value conflicts with a corresponding exclusive configuration parameter specified by another application using the assigned one data connection.

22. A non-transitory processor-readable storage medium having stored thereon processor-executable software instructions configured to cause a processor of a mobile device to perform operations comprising:
gathering exclusive and shareable configuration parameters specified by a new application requesting a data connection;
applying, for each open data connection of the plurality of open data connections, a parameter-specific union rule to each shareable configuration parameter specified by the new application and to each shareable configuration parameter specified by another application using the open data connection to determine a resultant parameter value for each shareable configuration parameter;
selecting one open data connection from among the plurality of open data connections based upon exclusive configuration parameters and resultant parameter values for each of the shareable configuration parameters; and
assigning the selected one open data connection to the application.

23. The non-transitory processor-readable storage medium of claim 22, wherein the stored processor-executable instructions are configured to cause the processor of the mobile device to perform operations further comprising:
assigning a priority to each of the plurality of the selected open data connections based on the determined resultant parameter values;
selecting the one open data connection with a highest assigned priority for assignment to the new application; and
configuring the assigned open data connection using the resultant parameter values determined for the open data connection with the highest assigned priority.

24. The non-transitory processor-readable storage medium of claim 23, further having stored thereon processor-executable instructions configured to cause the processor of the mobile device to perform operations further comprising:
determining for each open data connection of the plurality of open data connections whether any exclusive configuration parameters specified by the new application conflicts with exclusive configuration parameters specified by another application using the selected data connection;
removing from consideration any selected open data connection for which a configuration parameter requested by the new application conflicts with an exclusive parameter specified by another application using that selected open data connection; and
establishing a new data connection if all open data connections are removed from consideration as a result of conflicting exclusive requirements.

25. The non-transitory processor-readable storage medium of claim 23, further having stored thereon processor-executable instructions configured to cause the processor of the mobile device to perform operations further comprising:
reapplying the parameter-specific union rules to the shareable configuration parameters specified by applications sharing the assigned one data connection when an application sharing the assigned one data connection terminates; and
reconfiguring the assigned one data connection based upon resultant parameter values obtained from the reapplication of the parameter-specific union rules to the shareable configuration parameters.

26. The non-transitory processor-readable storage medium of claim 23, further having stored thereon processor-executable instructions configured to cause the processor of the mobile device to perform operations further comprising:
receiving a request from a first application sharing the assigned one data connection to modify one or more of the shareable configuration parameter values;
applying the parameter-specific union rules to the one or more shareable configuration parameter values and to corresponding configuration parameter values of each other application sharing the assigned one data connection, wherein modified resultant configuration parameter values are determined: and
updating the assigned one data connection configuration using the determined modified resultant configuration parameter values.

27. The non-transitory processor-readable storage medium of claim 23, wherein the stored processor-executable instructions are configured to cause the processor of the mobile device to perform operations such that the priority assigned to the selected open data connection based on the determined resultant parameter values represents a degree to which the determined resultant parameter values support all applications sharing the selected open data connection.

28. The non-transitory processor-readable storage medium of claim 22, further having stored thereon processor-executable instructions configured to cause the processor of the mobile device to perform operations further comprising:
- receiving a request from a first application sharing the assigned one data connection to modify one or more exclusive configuration parameter values;
- determining whether the modified one or more exclusive configuration parameter values conflicts with corresponding exclusive configuration parameters specified by another application using the assigned one data connection; and
- rejecting the request from the first application to modify one or more exclusive configuration parameter values in response to determining that any modified exclusive configuration parameter value conflicts with a corresponding exclusive configuration parameter specified by another application using the assigned one data connection.

* * * * *